July 24, 1923.
H. C. SHOCKEY ET AL
FLY CATCHING APPARATUS
Filed Sept. 7, 1921     2 Sheets-Sheet 1
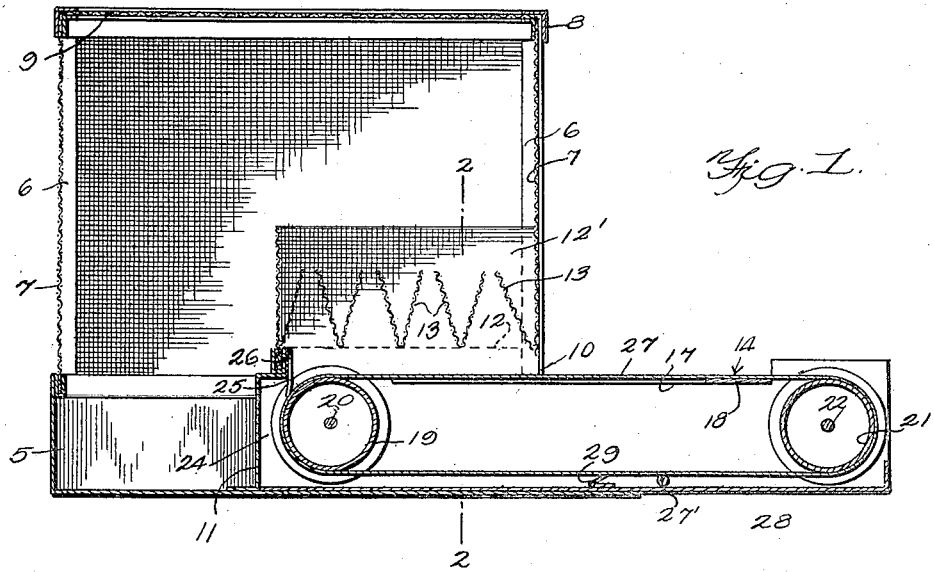
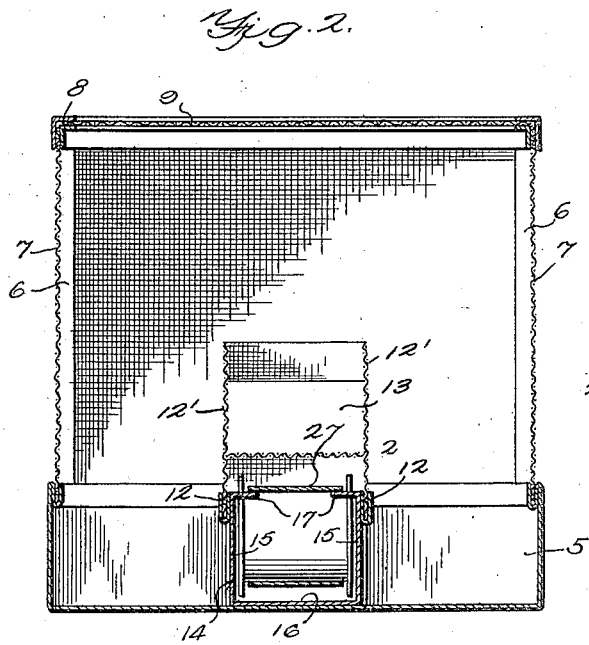
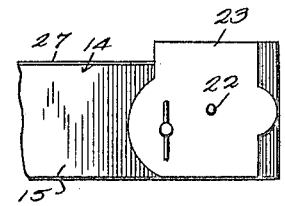
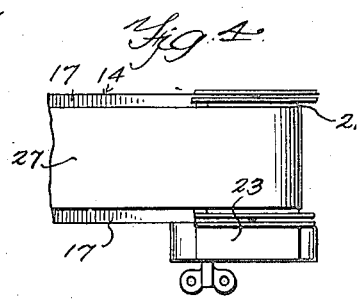
Inventors
Henry C. Shockey,
Thomas Fennell,
Jimy A. Mathews
By
Attorney July 24, 1923.
H. C. SHOCKEY ET AL
1,462,873
FLY CATCHING APPARATUS
Filed Sept. 7, 1921
2 Sheets-Sheet 2
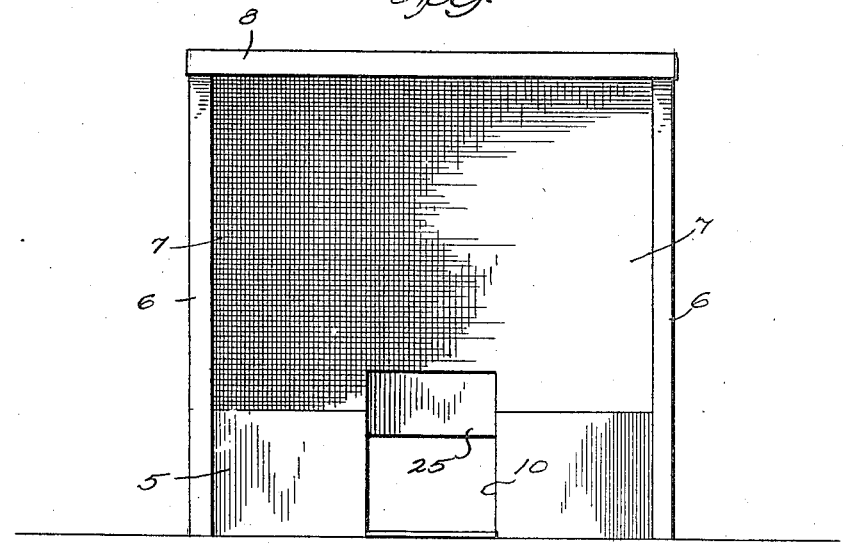
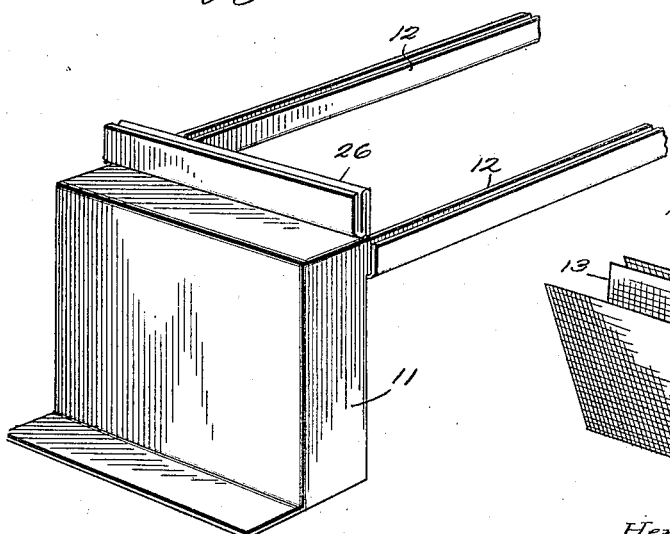
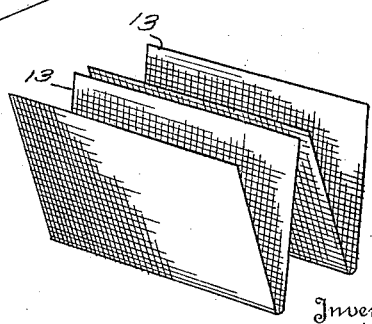
Inventors,
Henry C. Shockey
Thomas Fennell,
Jerry A Mathens,
By
Attorney Patented July 24, 1923.

1,462,873

UNITED STATES PATENT OFFICE.

HENRY C. SHOCKEY AND THOMAS FENNELL, OF CASA GRANDE, ARIZONA.

FLY-CATCHING APPARATUS.

Application filed September 7, 1921. Serial No. 499,010.

*To all whom it may concern:*

Be it known that HENRY C. SHOCKEY and THOMAS FENNELL, citizens of the United States, residing at Casa Grande, in the county of Pinal and State of Arizona, have invented certain new and useful Improvements in Fly-Catching Apparatus, of which the following is a specification.

The present invention relates to apparatus for catching flies.

An important object of the invention is to provide an apparatus of the above mentioned character, having a support carrying a conveyor, which support is adapted to have one end thereof removably mounted within the casing of the apparatus, the support being removable so that the endless belt or covering of the conveyor may be removed and a new one substituted therefor.

A further object of the invention is to provide a device of the above mentioned character, which is simple in construction, inexpensive to manufacture and highly convenient in use.

In the accompanying drawings forming a part of this specification, and in which like numerals are employed to designate like parts throughout the same, Fig. 1 is a central vertical longitudinal sectional view through apparatus embodying our invention, Fig. 2 is a transverse vertical section taken on line 2—2 of Fig. 1, Fig. 3 is a fragmentary side elevation of a conveyor support, Fig. 4 is a plan view of the same, Fig. 5 is a front elevation of the apparatus, with the conveyor support removed, Fig. 6 is a perspective view of the holding socket, and, Fig. 7 is a perspective view of the guide elements.

In the drawings, wherein for the purpose of illustration is shown a preferred embodiment of our invention, the numeral 5 designates a box or pan, preferably formed of sheet metal. A frame work 6 is secured to this pan and is covered by fly screening 7 or the like. The cover 8 is removably mounted upon the frame 6 and also embodies fly screening 9.

An opening 10 is formed in the front side of the box 5, and a holding box or socket 11, is rigidly mounted centrally within the box 5, upon its bottom. Horizontal bars 12 are connected with the holding socket or box 11 and extend forwardly for connection with the front side of the box 5. The bars 12 are spaced and receive a guide casing 12', preferably formed of fly screening. This casing has its top and bottom open and arranged within the casing are tapered elements 13, decreasing in width upwardly. These tapered elements are also preferably formed of fly screening and serve to permit the flies passing upwardly therethrough into the casing 7, but prevent them from returning.

The numeral 14 designates a conveyor support as a whole, embodying spaced side plates 15 and a bottom 16. Flanges 17 are formed upon the upper edges of the sides 15 and a transverse strip 18 serves to connect the flanges as shown.

A drum 19 is carried by a shaft 20 rotatably mounted in the side plates 15, near and spaced from their forward ends. The numeral 21 designates a coacting drum, rigididly mounted upon a shaft 22, journaled in the side plates 15. The shaft 22, receives its rotation from a spring motor 23, or any well known or preferred type. This spring motor is bodily mounted upon the outer or rear end of the support 14. Attention is called to the fact that the side plates 15 extend forwardly beyond the drum 19, as shown at 24, and these extensions 24 are adapted for insertion within the holding socket 11.

The numeral 25 designates a flexible band or strip, secured to the upstanding flange 26 and the socket 11, and adapted to slidably contact with an endless belt 27, carried by the drums 19 and 21. The belt 27 is adapted to receive thereon material to attract the flies, such as sugar, or the like. This material, such as sugar water, is constantly supplied to the exterior of the belt 27, by a roller 27', operating in a chamber or trough 28. The element 29 serves to close one end of the trough and also to scrape excess material from the belt.

We do not wish to restrict ourselves to the employment of an endless belt 27, as other conveying means may be used, nor do we wish to restrict the invention to the use of a spring motor 23, as other forms of motors may be employed.

In operation, with the parts arranged as shown in Fig. 1, the spring motor 23 drives the endless belt 27 so that its upper portion travels forwardly, as shown. When a fly is upon the belt 27 it is slowly conveyed into the guide casing 12, and when leaving the endless belt passes upwardly through the tapered elements 13 into the casing 7. When it is desired to remove or renew the endless belt 27, the support 14 is bodily withdrawn from within the box 5, the extensions 24 being removed from the holding socket 11. The endless belt may now be renewed and the support again inserted into the box 5, and held in place by the socket 11. The flies may be killed in the main frame cage 6 by any suitable means, such as by poison upon a ball suspended therein.

It is to be understood that the form of the invention herewith shown and described, is to be taken as a preferred example of the same, and that various changes in the shape, size, and arrangement of parts may be resorted to without departing from the spirit of the inventoin or the scope of the subjoined claim.

Having thus described our invention, we claim:

In fly catching apparatus, a main casing having an opening in one side thereof, a holding socket in the main casing in alignment with said opening, guide bars carried by said holding socket, a guide casing carried by said guide bars, tapered elements arranged in said guide casing, a support adapted for insertion in and through the opening in the main casing and having its forward end removably mounted within said holding socket, a conveyor element bodily mounted upon said support, and means to drive conveyor element.

In testimony whereof we affix our signatures.

HENRY C. SHOCKEY.
THOMAS FENNELL.